(12) United States Patent
Lin (10) Patent No.: US 7,467,458 B2
(45) Date of Patent: Dec. 23, 2008

(54) METHOD FOR USE IN MAKING A READ HEAD

(75) Inventor: Tsann Lin, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 203 days.

(21) Appl. No.: 10/779,941

(22) Filed: Feb. 17, 2004

(65) Prior Publication Data

US 2005/0177995 A1      Aug. 18, 2005

(51) Int. Cl.
*G11B 5/127* (2006.01)

(52) U.S. Cl. .............. 29/603.01; 29/603.13; 29/603.14; 29/831; 29/846; 360/326

(58) Field of Classification Search .............. 29/603.07, 29/846, 831, 603.13, 603.14, 832; 204/118, 204/122, 192.32, 192.33, 192.34; 360/317, 360/122, 126, 328, 326, 252, 324.1; 427/250, 427/252, 255.11, 255.18, 255.343, 253, 255, 427/343; 310/118, 122, 192.32, 192.34, 310/192, 33

See application file for complete search history.

(56) References Cited

U.S. PATENT DOCUMENTS

| | | | | |
|---|---|---|---|---|
| 3,152,886 A | * | 10/1964 | Nachtman et al. ............. | 75/623 |
| 3,602,778 A | * | 8/1971 | Ura et al. ..................... | 257/603 |
| 5,491,600 A | * | 2/1996 | Chen et al. ................... | 360/322 |
| 5,532,892 A | * | 7/1996 | Nix et al. ................. | 360/327.31 |
| 5,949,623 A | * | 9/1999 | Lin ....................... | 360/324.12 |
| 5,949,625 A | * | 9/1999 | Sato et al. .................. | 360/122 |
| 6,030,753 A | * | 2/2000 | Lin ............................ | 430/314 |
| 6,198,068 B1 | * | 3/2001 | Lindstrom ............. | 219/121.46 |
| 6,278,590 B1 | * | 8/2001 | Gill et al. ..................... | 360/317 |
| 6,291,087 B1 | * | 9/2001 | Xiao et al. ................ | 428/811.2 |
| 6,383,574 B1 | * | 5/2002 | Han et al. .................... | 427/526 |
| 6,449,131 B2 | * | 9/2002 | Guo et al. .................... | 360/315 |
| 6,563,678 B2 | * | 5/2003 | Sato .......................... | 360/320 |
| 6,617,265 B2 | * | 9/2003 | Tanaka et al. ............... | 438/782 |

* cited by examiner

*Primary Examiner*—A. Dexter Tugbang
*Assistant Examiner*—Tai Nguyen
(74) *Attorney, Agent, or Firm*—John J. Oskorep, Esq.; Rambod Nader (57) ABSTRACT

Methods of making a read sensor with a selectively deposited lead layers are disclosed. In one illustrative example, the method includes the acts of forming a plurality of read sensor layers over a wafer; forming a monolayer photoresist to mask the plurality of read sensor layers in a central region; ion milling to remove the unmasked plurality of read sensor layers in side regions to thereby form a read sensor in the central region; depositing longitudinal bias layers in the side regions; and depositing a silicon reactant layer over the longitudinal bias layers in the side regions. After removing the monolayer photoresist, a silicon reduction process and a hydrogen reduction process are sequentially performed for the selective depositions of the lead material. In the silicon reduction process, tungsten hexafluoride ($WF_6$) and argon (Ar) gases are passed over the wafer to thereby selectively deposit a relatively thin W film only on the Si reactant layer in the side regions through the following chemical reaction: $2WF_6 + 3Si \rightarrow 2W + 3SiF_4$. In the hydrogen reduction process, $WF_6$ and hydrogen ($H_2$) gases are passed over the wafer to thereby selectively deposit a relatively thick W film only on the W film in the side regions through the following chemical reaction: $WF_6 + 3H_2 \rightarrow W + 6HF$.

24 Claims, 11 Drawing Sheets

FIG. 9
(ABS)

METHOD FOR USE IN MAKING A READ HEAD

BACKGROUND OF THE INVENTION

1. Field of the Invention

The present invention relates generally to a fabrication method for a giant magnetoresistive (GMR) sensor employed within a magnetic read head. More particularly, the present invention relates to a fabrication process for a GMR read sensor utilizing a silicon reduction process and a hydrogen reduction process to selectively deposit lead layers over longitudinal bias layers in side regions of a read sensor.

2. Description of the Related Art

Computers often include auxiliary memory storage devices having media on which data can be written and from which data can be read for later use. A direct access storage device (disk drive) incorporating rotating magnetic disks are commonly used for storing data in magnetic form on the disk surfaces. Data is written on concentric, radially spaced tracks on the disk surfaces by a write head, and is then read by a read head.

In a high capacity disk drive, a magnetoresistive (MR) read head which includes an MR read sensor is prevailing because of their capability to read data from a surface of a disk at greater linear densities than a thin film inductive head. The MR read sensor detects a magnetic field through the change in the resistance of its MR sense layer (also referred to as an "MR element") as a function of the strength and direction of the magnetic flux being sensed by the MR sense layer.

The conventional MR sensor operates on the basis of an anisotropic magnetoresistive (AMR) effect in which the MR element resistance varies as the square of the cosine of the angle between the magnetization of the MR element and the direction of sense current flow through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Within the general category of MR sensors is the giant magnetoresistance (GMR) sensor manifesting the GMR effect. In GMR sensors, the resistance of the MR sense layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers. Currently GMR sensors using only two layers of ferromagnetic material (e.g., nickel-iron, cobalt-iron, or nickel-iron-cobalt) separated by a layer of nonmagnetic material (e.g., copper) are extensively used in data storage devices.

In a GMR sensor, one of the ferromagnetic layers referred to as the pinned layer, has its magnetization typically pinned by exchange coupling with an antiferromagnetic (AFM) layer (e.g., nickel-oxide, iron-manganese, nickel-manganese, iridium-manganese, or platinum-manganese) layer. The pinning field generated by the AFM layer should be greater than demagnetizing fields to ensure that the magnetization direction of the pinned layer remains fixed during application of external fields (e.g. fields from bits recorded on the disk). The magnetization of the other ferromagnetic layer, referred to as the free layer, however, is not fixed and is free to rotate in response to the field from the information recorded on the magnetic medium (the signal field). A cap layer of tantalum is typically formed over the GMR sensor for protecting it during its fabrication.

A "bottom-type" GMR sensor may be formed in a conventional fashion by initially depositing read sensor layers of Ni—Cr—Fe(3)/Ni—Fe(1)/Pt—Mn(15)/Co—Fe(1.6)/Ru (0.8)/Co—Fe(1.6)/Cu—O(2)/Co—Fe(1)/Ni—Fe(1.6)/Cu (0.6)/Ta(6) (thickness in nm) over a bottom gap layer of $Al_2O_3$. A monolayer photoresist is then formed and patterned over the read sensor layers in a central region. Ion milling is then performed to remove read sensor layers, as well as some gap layer material, in side regions. Longitudinal bias layers of Cr(22)/Co—Pt—Cr(10) and lead layers of Rh(45) are then deposited, preferably by ion beam sputtering at a normal angle for abutting the sensor at it edges. The monolayer photoresist is then removed with use of a chemical mechanical polishing (CMP) lift-off process. Thereafter, a top $Al_2O_3$ gap layer is formed over the entire read head.

There are several disadvantages of the conventional bottom-type GMR sensor and the method by which it is made, as described above. First, in order to attain a stable GMR response, the Cr film in the longitudinal bias layers must be formed thick enough to align the midplane of the Co—Pt—Cr film with that of the sense or free layers (Co—Fe/Ni—Fe) of the read sensor. When this alignment is attempted, however, the Cr film has a relatively large thickness at the contiguous junctions; this causes the Co—Pt—Cr film and the free layer to be separated, which significantly reduces the stabilization efficiency. Second, the lead layers of Rh must be formed with a relatively large thickness so that they provide a relatively low-resistance electrical path. Unfortunately, the relatively large thickness of the leads causes Rh material to form over the sides of the monolayer photoresist, which makes it difficult to remove the monolayer photoresist with the CMP lift-off process. Third, there is a concern with using a CMP lift-off process to remove the monolayer photoresist due to potential damage to the read sensor layers. As apparent, it is difficult to form both thick longitudinal bias and lead layers in achieving the above-stated advantages without having difficulties in removing the monolayer photoresist.

Accordingly, there is an existing need to overcome these and other deficiencies of the prior art.

SUMMARY

Methods of making a read sensor with selectively deposited lead layers are described herein. In one illustrative example, the method includes the acts of forming a plurality of read sensor layers over a wafer; forming a monolayer photoresist to mask the plurality of read sensor layers in a central region; ion milling to remove the unmasked plurality of read sensor layers in side regions to thereby form a read sensor in the central region; depositing longitudinal bias layers in the side regions; and depositing a silicon reactant layer over the longitudinal bias layers in the side regions. After removing the monolayer photoresist, a silicon reduction process and a hydrogen reduction process are sequentially performed for the selective depositions of the lead material.

In the silicon reduction process, tungsten hexafluoride ($WF_6$) and argon (Ar) gases are passed over the wafer to thereby selectively deposit a relatively thin W film only on the silicon reactant layer in the side regions through the following chemical reaction: $2WF_6 + 3Si \rightarrow 2W + 3SiF_4$. In the hydrogen reduction process, $WF_6$ and hydrogen ($H_2$) gases are passed over the wafer to thereby selectively deposit a relatively thicker W film only on the W film in the side regions through the following chemical reaction: $WF_6 + 3H_2 \rightarrow W + 6HF$.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
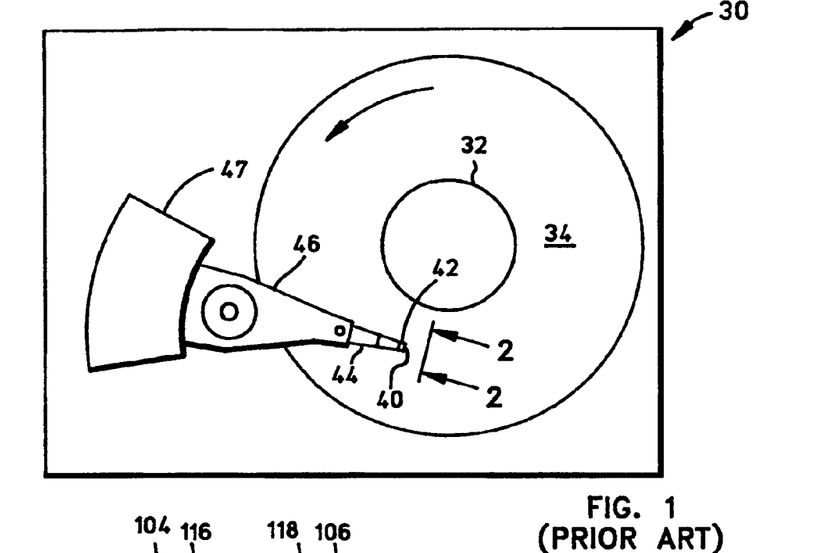
FIG. 1 is a plan view of an exemplary magnetic disk drive.
Figures 2, 3:
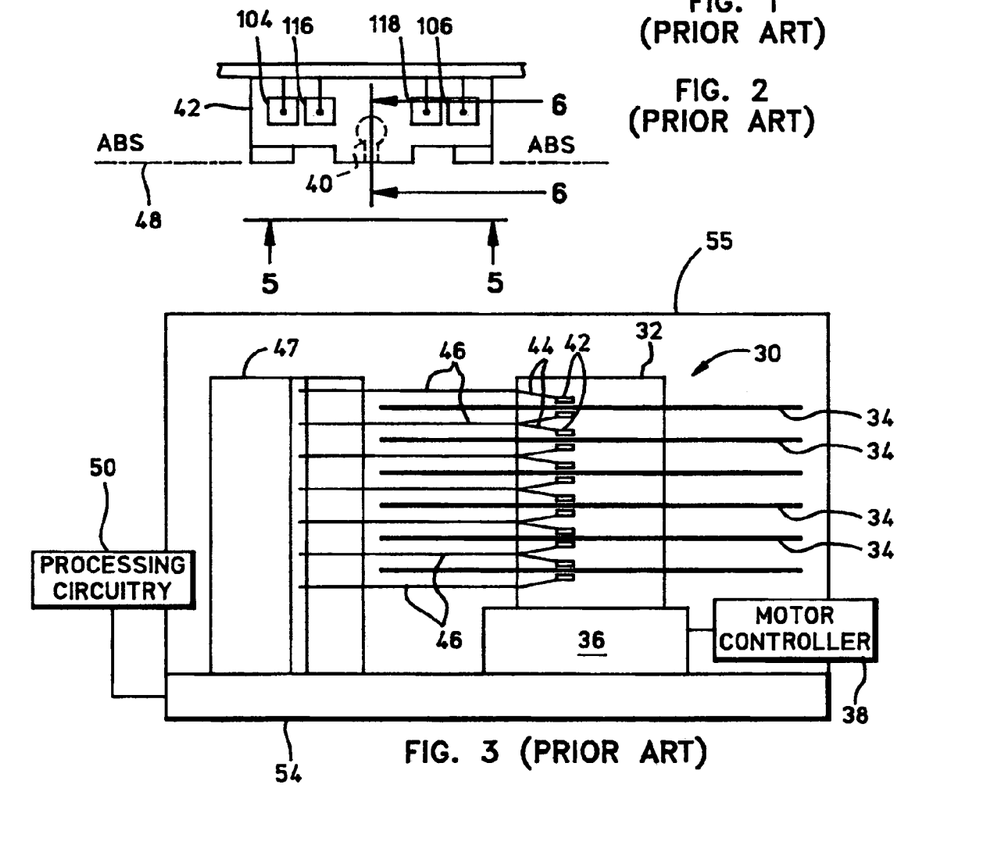
FIG. 2 is an end view of a slider with a magnetic read head of the disk drive as seen in plane 2-2 of FIG. 1.
FIG. 3 is an elevation view of the magnetic disk drive wherein multiple disks and magnetic read heads are employed.
Figure 4:
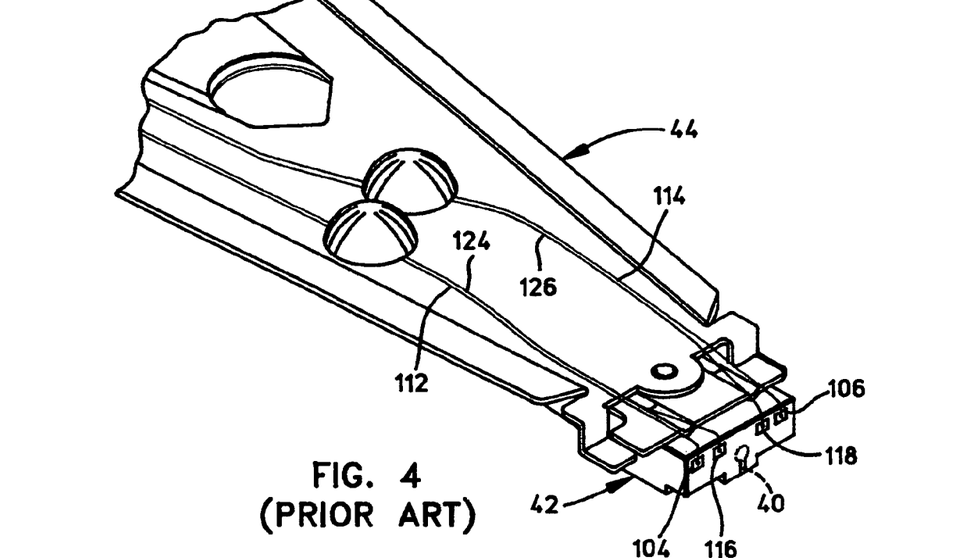
FIG. 4 is an isometric illustration of an exemplary suspension system for supporting the slider and magnetic read head.
Figure 5:
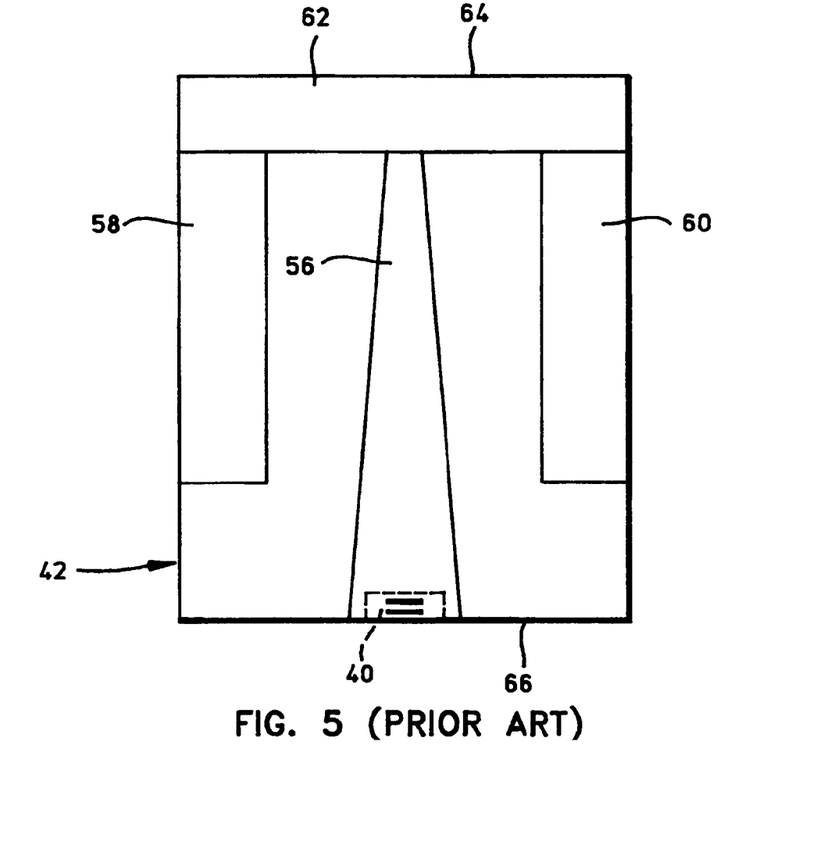
FIG. 5 is an air bearing surface (ABS) view of the magnetic read head taken along plane 5-5 of FIG. 2.

Referring now to the drawings wherein like reference numerals designate like or similar parts throughout the several views, FIGS. 1-3 illustrate a magnetic disk drive 30. Disk drive 30 includes a spindle 32 that supports and rotates a magnetic disk 34. Spindle 32 is rotated by a spindle motor 36 that is controlled by a motor controller 38. A slider 42 includes a combined read and write magnetic head 40 and is supported by a suspension 44 and actuator arm 46 that is rotatably positioned by an actuator 47. Magnetic head 40 may utilize the read sensor which is made in accordance with the present invention. A plurality of disks, sliders, and suspensions may be employed in a large capacity direct access storage device (DASD) as shown in FIG. 3. Suspension 44 and actuator arm 46 are moved by actuator 47 to position slider 42 so that magnetic head 40 is in a transducing relationship with a surface of magnetic disk 34. When disk 34 is rotated by spindle motor 36, slider 42 is supported on a thin (typically, 0.05 μm) cushion of air (air bearing) between the surface of disk 34 and an air bearing surface (ABS) 48. Magnetic head 40 may then be employed for writing information to multiple circular tracks on the surface of disk 34, as well as for reading information therefrom. Processing circuitry 50 exchanges signals, representing such information, with head 40, provides spindle motor drive signals for rotating magnetic disk 34, and provides control signals to actuator 47 for moving slider 42 to various tracks. In FIG. 4, slider 42 is shown mounted to a suspension 44. The components described hereinabove may be mounted on a frame 54 of a housing 55, as shown in FIG. 3. FIG. 5 is an ABS view of slider 42 and magnetic head 40. Slider 42 has a center rail 56 that supports magnetic head 40, and side rails 58 and 60. Rails 56, 58 and 60 extend from a cross rail 62. With respect to rotation of magnetic disk 34, cross rail 62 is at a leading edge 64 of slider 42 and magnetic head 40 is at a trailing edge 66 of slider 42.

Figure 6:
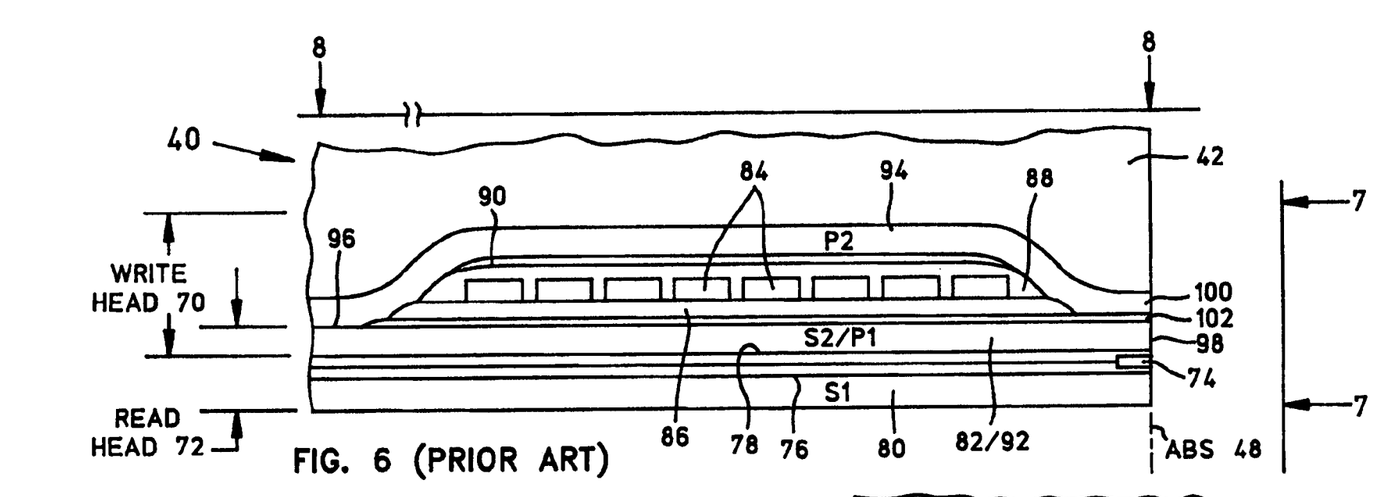
FIG. 6 is a partial view of the slider and a merged magnetic read head as seen in plane 6-6 of FIG. 2.
Figure 7:
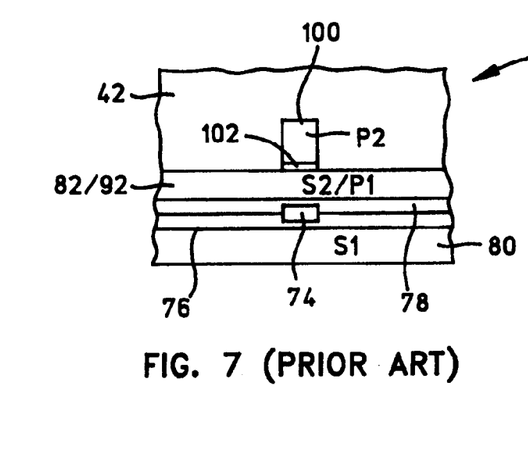
FIG. 7 is a partial ABS view of the slider taken along plane 7-7 of FIG. 6 to show the read and write elements of the merged magnetic read head.

FIG. 6 is a side cross-sectional elevation view of a merged magnetic head 40, which includes a write head portion 70 and a read head portion 72. Read head portion 72 includes a giant magnetoresistive (GMR) read head which utilizes a GMR sensor 74. FIG. 7 is an ABS view of FIG. 6. GMR sensor 74 is sandwiched between nonmagnetic electrically insulative first and second read gap layers 76 and 78, and read gap layers 76 and 78 are sandwiched between ferromagnetic first and second shield layers 80 and 82. In response to external magnetic fields, the resistance of GMR sensor 74 changes. A sense current $I_s$ conducted through the sensor causes these resistance changes to be manifested as potential changes. These potential changes are then processed as readback signals by processing circuitry 50 shown in FIG. 3.

Figure 8:
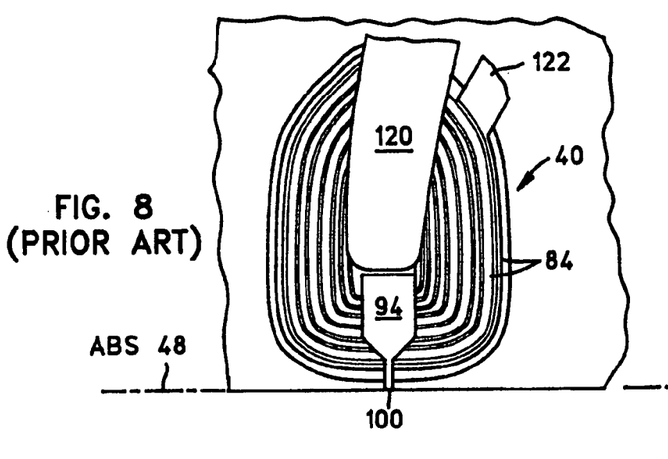
FIG. 8 is a view taken along plane 8-8 of FIG. 6 with all material above the coil layer and leads removed.

Write head portion 70 of magnetic head 40 includes a coil layer 84 sandwiched between first and second insulation layers 86 and 88. A third insulation layer 90 may be employed for planarizing the head to eliminate ripples in the second insulation layer caused by coil layer 84. The first, second and third insulation layers are referred to in the art as an "insulation stack". Coil layer 84 and first, second and third insulation layers 86, 88 and 90 are sandwiched between first and second pole piece layers 92 and 94. First and second pole piece layers 92 and 94 are magnetically coupled at a back gap 96 and have first and second pole tips 98 and 100 which are separated by a write gap layer 102 at the ABS. Since second shield layer 82 and first pole piece layer 92 are a common layer, this head is known as a merged head. In a piggyback head an insulation layer is located between a second shield layer and a first pole piece layer. As shown in FIGS. 2 and 4, first and second solder connections 104 and 106 connect leads from spin valve sensor 74 to leads 112 and 114 on suspension 44, and third and fourth solder connections 116 and 118 connect leads 120 and 122 from the coil 84 (see FIG. 8) to leads 124 and 126 on suspension 44.

Figure 9:
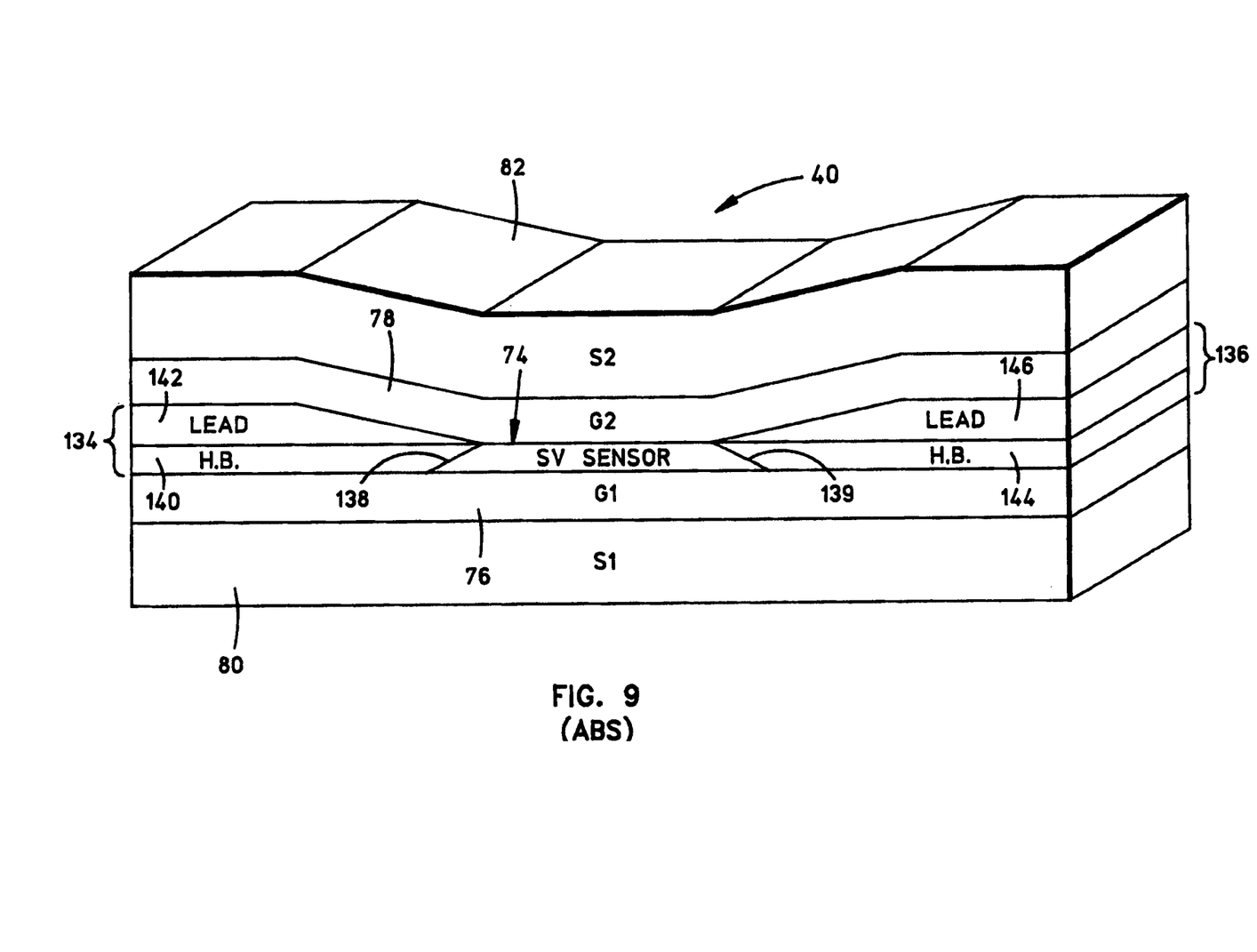
FIG. 9 is an enlarged isometric illustration of the magnetic read head having a GMR sensor.

FIG. 9 is an enlarged isometric ABS illustration of read head 40 shown in FIG. 7 which includes GMR sensor 74. First and second longitudinal bias and lead layers 134 and 136 are connected to first and second side edges 138 and 139 of spin valve sensor 74. This connection is known in the art as a contiguous junction and is fully described in commonly assigned U.S. Pat. No. 5,018,037 which is incorporated by reference herein. First longitudinal bias and lead layers 134 include a first longitudinal bias layer 140 and a first lead layer 142, and second longitudinal bias and lead layers 136 include a second longitudinal bias layer 144 and a second lead layer 146. longitudinal bias layers 140 and 144 cause magnetic fields to extend longitudinally through GMR sensor 74 for stabilizing the magnetic domains therein. GMR sensor 74 and first and second longitudinal bias and lead layers 134 and 136 are located between the nonmagnetic electrically insulative first and second read gap layers 76 and 78. First and second read gap layers 76 and 78 are, in turn, located between ferromagnetic first and second shield layers 80 and 82.

Figure 10:
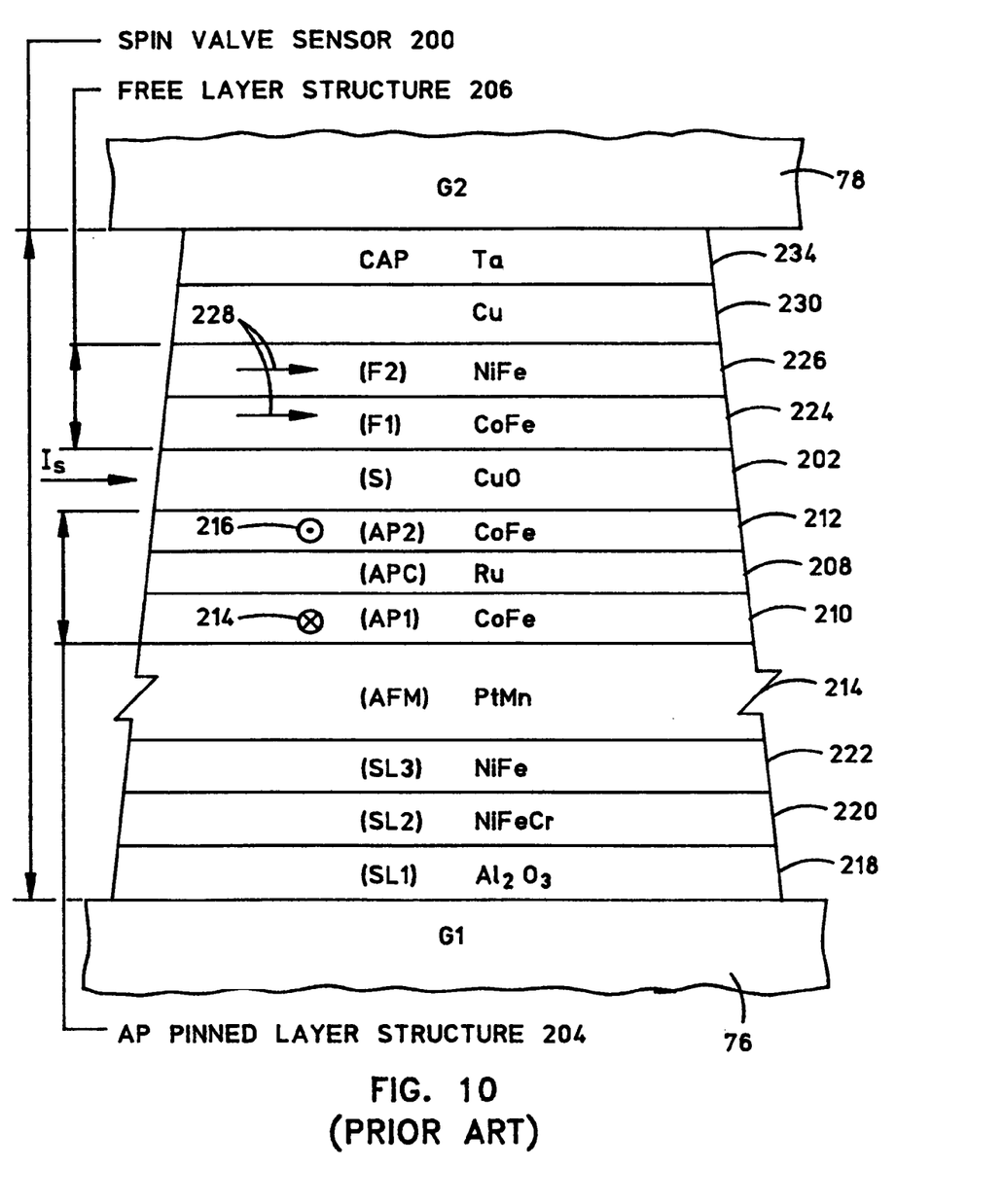
FIG. 10 is an ABS illustration of a typical multi-layer structure of a bottom-type GMR sensor.

FIG. 10 shows an ABS illustration of a typical multi-layered structure of a "bottom-type" GMR sensor 200 located between first and second read gap layers 76 and 78. GMR sensor 200 includes a non-magnetic electrically conductive spacer (S) layer 202 which is located between an antiparallel (AP) pinned layer structure 204 and a free layer structure 206. AP pinned layer structure 204 includes an antiparallel coupling (APC) layer 208 which is located between first and second ferromagnetic AP pinned layers (AP1) and (AP2) 210 and 212. First AP pinned layer 210 is exchange coupled to an antiferromagnetic (AFM) pinning layer 214 which pins a magnetic moment 214 of first AP pinned layer 210 perpendicular to the ABS in a direction out of or into sensor 200, as shown in FIG. 10. By strong antiparallel coupling between first and second AP pinned layers 210 and 212, a magnetic moment 216 of second AP pinned layer 212 is antiparallel to magnetic moment 214. First, second, and third seed layers (SL1), (SL2) and (SL3) 218, 220, and 222 may be provided between first read gap layer 76 and pinning layer 214 for promoting a desirable texture of the layers deposited thereon. Free layer structure 206 includes first and second free ferromagnetic layers (F1) and (F2) 224 and 226, with first free layer 224 interfacing spacer layer 202. Free layer structure 224 has a magnetic moment 228 which is oriented parallel to the ABS and to the major planes of the layers in a direction from right to left, or from left to right, as shown in FIG. 10. Note that, in the "bottom-type" configuration, free layers 224 and 226 are located in the top portion of sensor 200. A cap layer 234 is formed over free layer structure 206 for protecting the GMR sensor.

When a signal field from the rotating magnetic disk rotates magnetic moment 228 into the sensor, magnetic moments 228 and 216 become more antiparallel which increases the resistance of the sensor to the sense current ($I_S$). When a signal field rotates magnetic moment 228 of free layer structure 206, magnetic moments 228 and 216 become more parallel which reduces the resistance of sensor 200 to the sense current ($I_S$). These resistance changes are processed as playback signals by processing circuitry (i.e. processing circuitry 50 of FIG. 3).

The following materials may be utilized in the multilayered GMR sensor 200 of FIG. 10. First, second, and third seed layers are made of alumina ($Al_2O_3$), nickel-chromium-iron (Ni—Cr—Fe), and nickel-iron (Ni—Fe), respectively, from bottom to top; AFM layer 214 is made of platinum-manganese (Pt—Mn) or alternatively of iridium-manganese (Ir—Mn); AP pinned layers 210 and 212 are made of cobalt-iron (Co—Fe); APC layer 208 is made of ruthenium (Ru); first and second free layers 224 and 226 are made of cobalt-iron (Co—Fe) and nickel-iron (Ni—Fe), respectively; spacer layer 202 is made of copper (Cu) or oxygen-doped copper (Cu—O); and cap layer 234 is made of tantalum (Ta). A copper (Cu) layer 230 may be located on second free layer 226 for reflecting conduction electrons back into the mean free path of conduction electrons. Thicknesses of particular materials may be 3 nanometers (nm) of $Al_2O_3$ for first seed layer 218; 3 nm of Ni—Fe—Cr for second seed layer 220; 1 nm of Ni—Fe for third seed layer 222; 3 nm of Pt—Mn for AFM layer 214, various thicknesses ranging from 1 to 3 nm of 90Co-10Fe (in atomic) for first AP pinned layer 210; 0.8 nm of Ru for APC layer 208; various thicknesses ranging from 1 to 3 nm of 90Co-10Fe for second AP pinned layer 212; 2 nm of Cu—O for spacer layer 202; 1 nm of 86Co-14Fe for first free layer 224; 1.6 nm of 90Ni-10Fe for the (where subscripts indicate weight percent of a particular element) for second free layer 226; 0.6 nm of Cu for first cap layer 230; and 6 nm of Ta for second cap layer 234.

Figure 11:
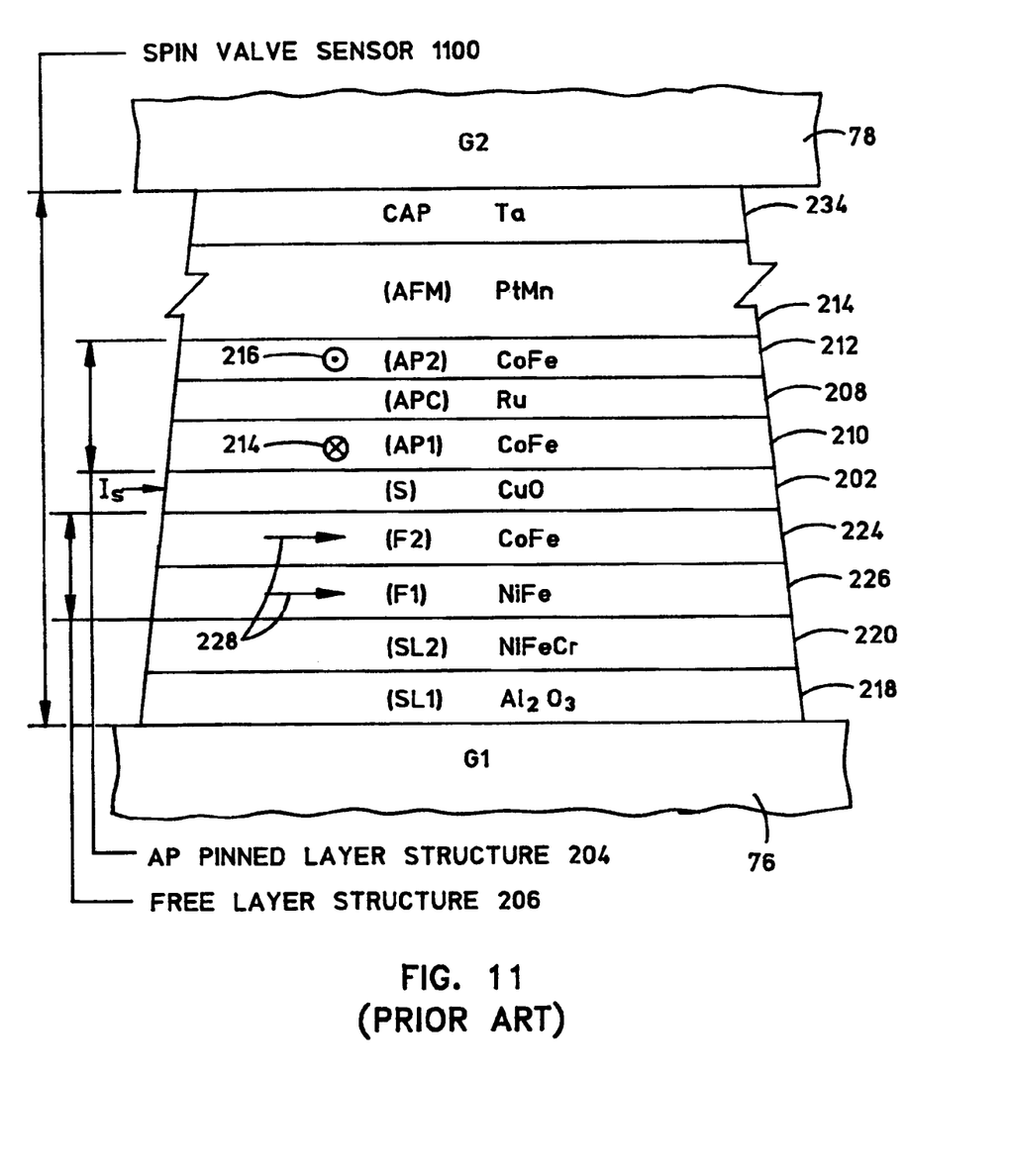
FIG. 11 is an ABS illustration of a typical multi-layer structure of a top-type GMR sensor.

FIG. 11 shows an ABS illustration of a typical multi-layered structure of a "top-type" GMR sensor 1100. As apparent, the GMR sensor 1100 of FIG. 11 is the same as that in FIG. 10 except that the most layers are inverted. In the "top-type" configuration, the free layers 224 and 226 are located in the lower portion of sensor 200.

Figure 12:
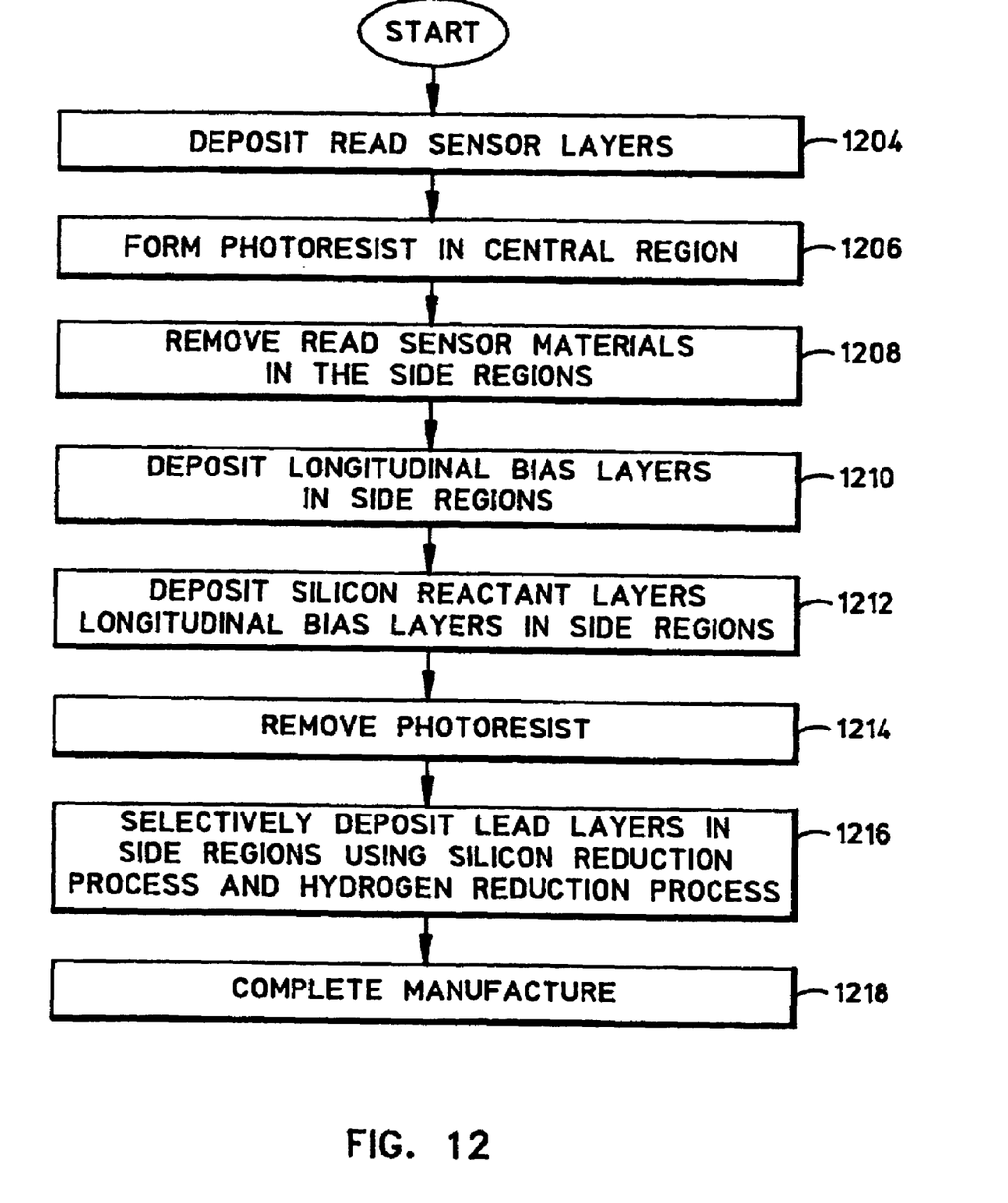
FIG. 12 is a flowchart which describes a fabrication process for a GMR read sensor which utilizes a silicon reduction process and a hydrogen reduction process to deposit lead layers over longitudinal bias layers in the side regions.

FIG. 12 is a flowchart which describes a fabrication process for a GMR read sensor with selectively deposited lead layers. FIGS. 13-20, which are a series of ABS illustrations showing partially fabricated sensor structures corresponding to the steps described in the flowchart of FIG. 12, will be referred to in combination with the flowchart steps of FIG. 12.

Figure 13:
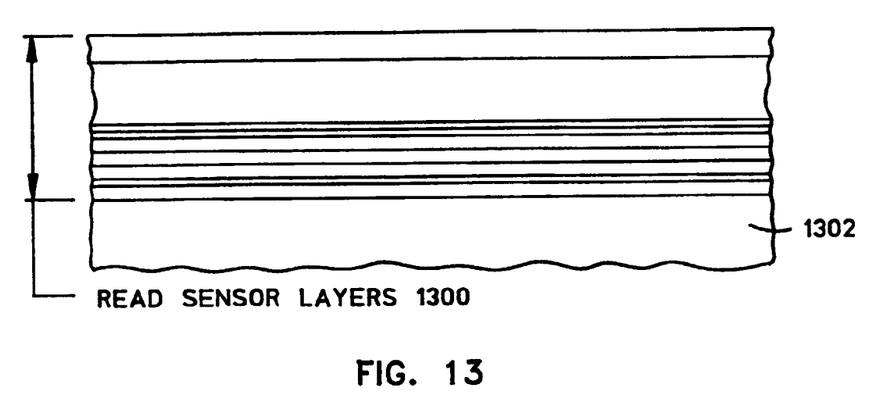
FIG. 13 is the first in a series of ABS illustrations of FIGS. 13-20 of partially fabricated sensor structures corresponding to the steps described in the flowchart of FIG. 12, showing that a plurality of read sensor layers are formed over a wafer.

Beginning with FIG. 13, it is shown that a plurality of GMR read sensor layers 1300 are deposited over a wafer with a bottom gap layer 76 (step 1204 of FIG. 12). Bottom gap layer 76 may be made of any suitable dielectric material, such as $Al_2O_3$. The plurality of GMR read sensor layers 1300 are formed so as to provide a "top-type" GMR read sensor configuration, which will be described later in more detail with respect to FIG. 20. Next, in FIG. 14, a monolayer photoresist 1400 is applied and patterned over the GMR read sensor layers 1300 in a central region using a photolithographic tool (step 1206 of FIG. 12). This monolayer photoresist 1400 is formed so as to define an appropriate trackwidth (TW) for the GMR read sensor. Monolayer photoresist 1400 may be made of a polyphenolic polymer or polyvinylphenol. Polyphenolic polymer is a copolymer of phenol and formaldehyde and is also known commercially as Novolak, which can be purchased from Hoechst Celanese, Sumitomo, or Shipley. Preferably, monolayer photoresist 1400 is formed of a single layer and does not include a bottom release layer and/or undercuts. Such a monolayer photoresist 1400 may be formed to a thickness within the range of about 150~600 nm.

To form monolayer photoresist 1400 in the central region, a full thin film of photoresist is initially formed over GMR read sensor layers 1300. This thin film of photoresist is light-exposed in regions which are to be removed, provided the photoresist is a positive photoresist. If the photoresist is a negative photoresist, it is light-exposed in the regions that are to be retained. Next, the photoresist is subjected to a basic developer solution. The developer used may be, for example, aqueous potassium hydroxide (KOH) developer, such as 1:6 2401 (Shipley) or 1:4 AZ 400 K (Hoechst Celanese) wherein the ratios are the developer to water. In a 1:6 2401 developer, the develop time can be up to 3 minutes for the purpose of removing light-exposed photoresist portions. Other basic aqueous developers may be utilized as well, such as 2.38% tetramethylammonium hydroxide (TMAH).

Figure 14:
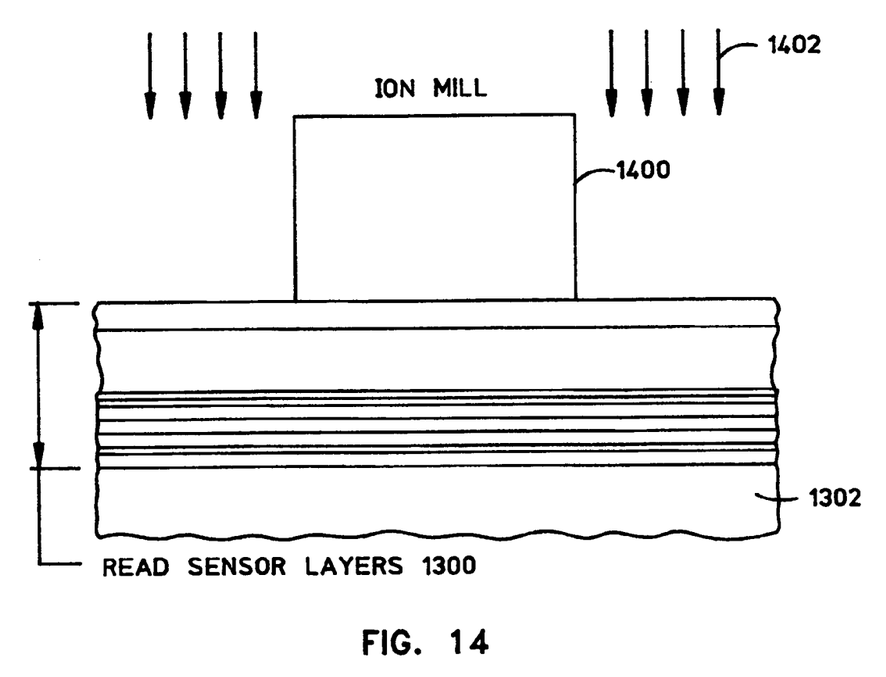
FIG. 14 is the second in a series of ABS illustrations of FIGS. 13-20 of partially fabricated sensor structures corresponding to the steps described in the flowchart of FIG. 12, which is the same as that shown in FIG. 13 except that a monolayer photoresist is applied and patterned on top of the read sensor layers in the central region.
Figure 15:
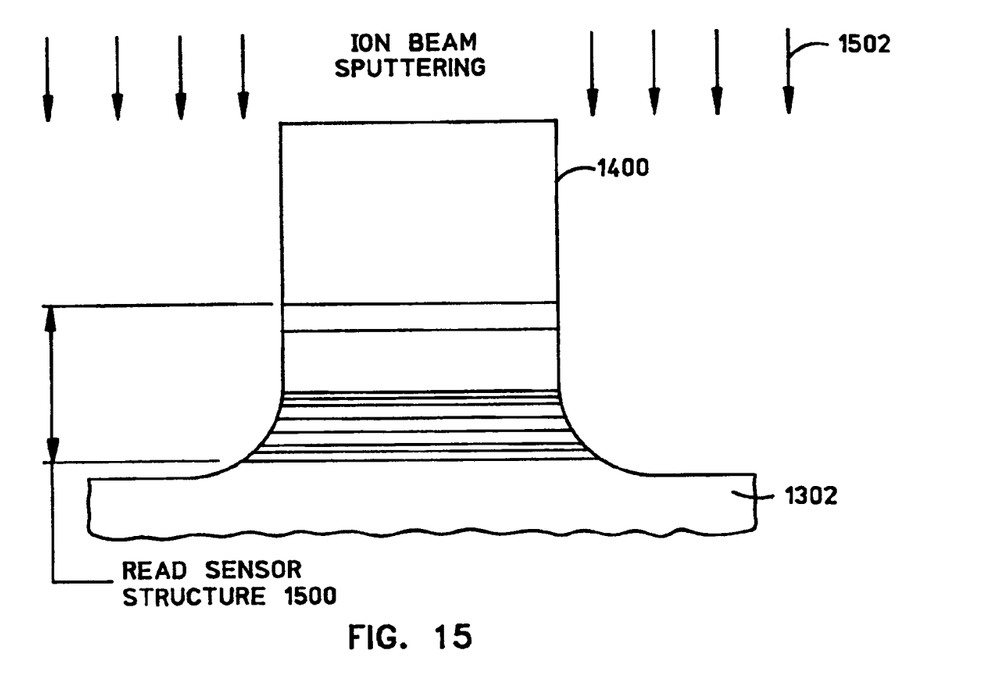
FIG. 15 is the third in a series of ABS illustrations of FIGS. 13-20 of partially fabricated sensor structures corresponding to the steps described in the flowchart of FIG. 12, which is the same as that shown in FIG. 14 except where read sensors materials are removed in the side regions from a previous ion milling process.
Figure 16:
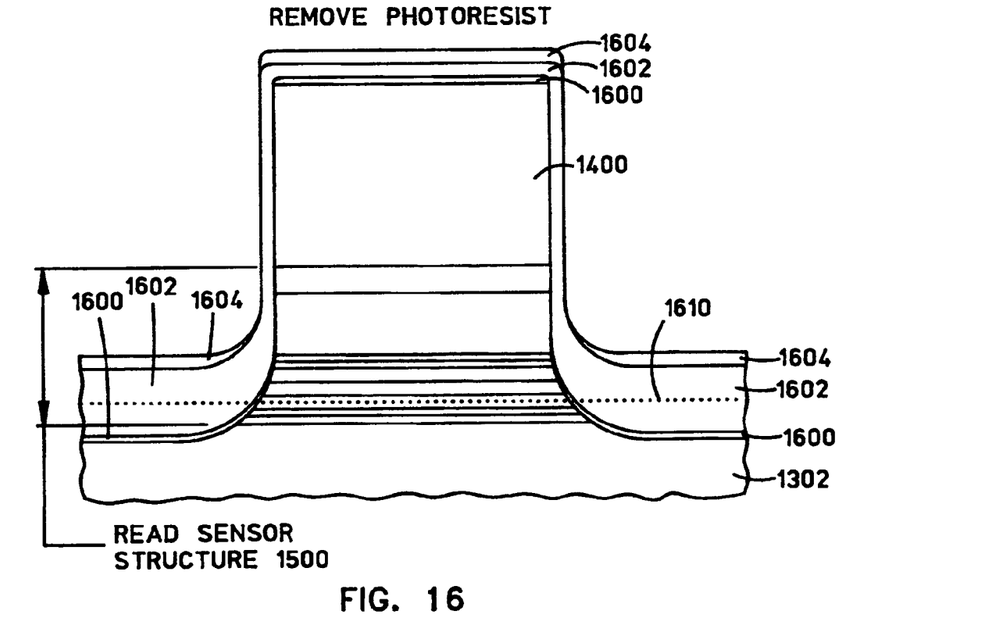
FIG. 16 is the fourth in a series of ABS illustrations of FIGS. 13-20 of partially fabricated sensor structures corresponding to the steps described in the flowchart of FIG. 12, which is the same as that shown in FIG. 15 except that longitudinal bias layers and a silicon reactant layers are deposited in the side regions using ion beam sputtering.

With monolayer photoresist 1400 kept in place, an ion milling process 1402 of FIG. 14 is then performed to remove the GMR read sensor layers in the exposed side regions (step 1208 of FIG. 12). The ion milling process 1402 is continued further until the top portion of bottom gap layer 76 is removed in the side regions, to thereby result in a GMR read sensor structure 1500 only in the central region as shown in FIG. 15. As apparent, the ion milling process forms relatively sharp and steep contiguous junctions. In FIG. 16, longitudinal bias layers 1600 and 1602 are then deposited over the structure with monolayer photoresist 1400 kept in place (step 1210 of FIG. 12). In particular, the longitudinal bias layers 1600 and 1602 are deposited via ion beam sputtering deposition at 10° from normal. Note that longitudinal bias layers 1600 and 1602 are formed in the side regions adjacent to the edges of GMR read sensor 1500, as well as all the way up and around monolayer photoresist 1400. Once monolayer photoresist 1400 is removed in a subsequent step, however, longitudinal bias layers 1600 and 1602 will remain formed only in the side regions (i.e. not in the central region).

In the present embodiment, longitudinal bias layers 1600 used for a hard-magnetic stabilization scheme includes a chromium (Cr) film deposited to a thickness of about 3 nm, a hard-magnetic cobalt-platinum-chromium (Co—Pt—Cr) film 1602 deposited to a thickness of about 10 nm, and another Cr film deposited to a thickness of about 3 nm. Specifically, Co—Pt—Cr layer 1602 are formed such that the midplane of the Co—Pt—Cr layer is aligned with the midplane of the free layers of the GMR read sensor 1500, as is indicated by a dotted line 1610 of FIG. 16. This will be described later in more detail with respect to FIG. 20. Although Cr and Co—Pt—Cr films are utilized in the present embodiment, other longitudinal bias layers used for an antiferromagnetic stabilization scheme may be utilized. For example, longitudinal bias layers 1600 may include a cobalt-iron (Co—Fe) film deposited to a thickness of about 3 nm, an antiferromagnetic platinum-manganese (Pt—Mn) film 1602 deposited to a thickness of about 12 nm, and a Cr film deposited to a thickness of about 3 nm.

In FIG. 16, it is shown that a silicon (Si) reactant layer 1604 is then formed over the structure (step 1212 of FIG. 12). This layer may be deposited via ion beam sputtering deposition at 10° from normal, similar to the deposition of longitudinal bias layers 1600 and 1602. Note that silicon reactant layer 1604 is formed adjacent to read sensor structure 1500 over longitudinal bias layers 1602, as well as all the way up and around monolayer photoresist 1400. Once monolayer photoresist 1400 is removed in a subsequent step, however, silicon reactant layer 1604 will be formed only in the side regions over longitudinal bias layer 1602. In the present embodiment, the silicon reactant layer 1604 is deposited to a thickness of about 3 nm.

Figure 17:
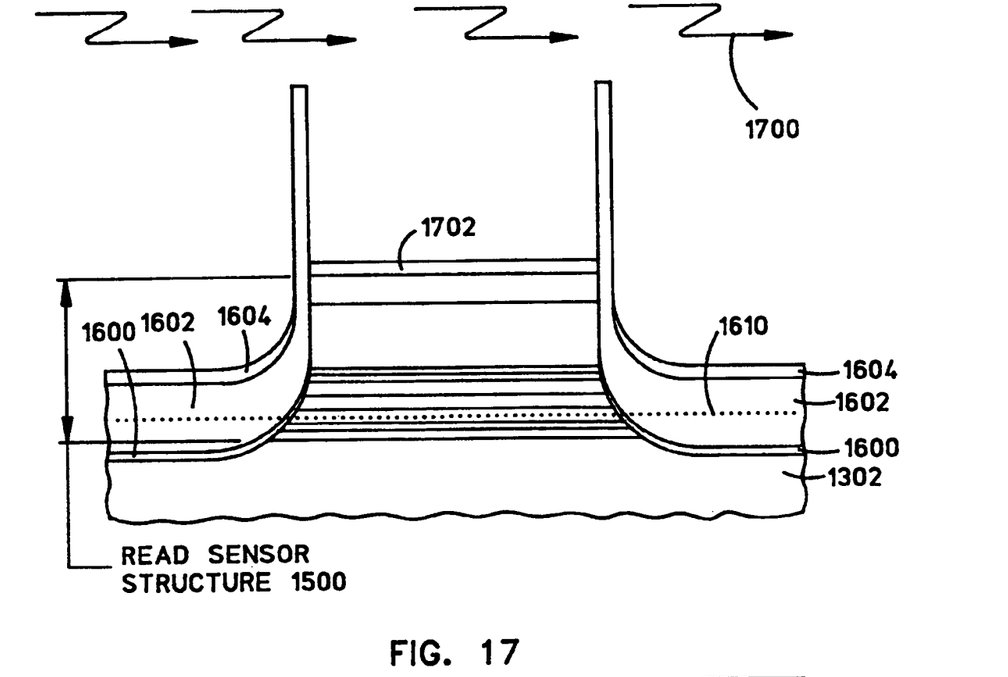
FIG. 17 is the fifth in a series of ABS illustrations of FIGS. 13-20 of partially fabricated sensor structures corresponding to the steps described in the flowchart of FIG. 12, which is the same as that shown in FIG. 16 except that the monolayer photoresist is removed.
Figure 18:
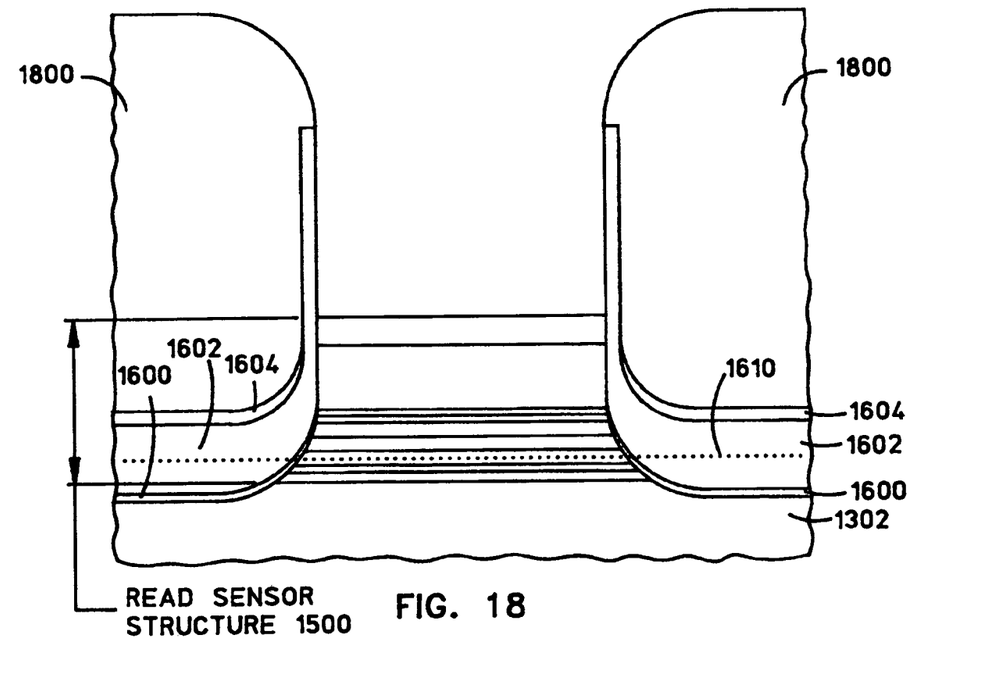
FIG. 18 is the sixth in a series of ABS illustrations of FIGS. 13-20 of partially fabricated sensor structures corresponding to the steps described in the flowchart of FIG. 12, which is the same as that shown in FIG. 17 except that lead layers are formed in the side regions with use of a silicon reduction process and a hydrogen reduction process.
Figure 19:
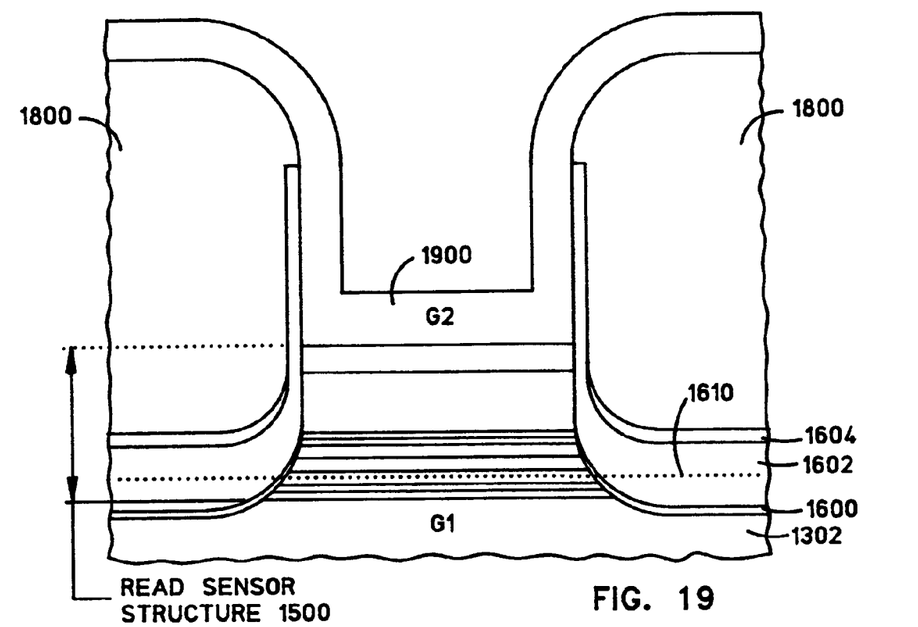
FIG. 19 is the seventh in a series of ABS illustrations of FIGS. 13-20 of partially fabricated sensor structures corresponding to the steps described in the flowchart of FIG. 12, which is the same as that shown in FIG. 18 except that a top gap layer is formed over the entire read head.

Monolayer photoresist 1400 over GMR read sensor 1500 is then removed utilizing a suitable solvent which dissolves monolayer photoresist 1400 (step 1214 of FIG. 12). FIG. 17 shows the resulting structure with the monolayer photoresist removed. As apparent, a lift-off process utilizing a chemical-mechanical polishing (CMP) technique is not required to remove the monolayer photoresist, as the photoresist removal is done shortly after the deposition of relatively thin longitudinal bias layers and prior to the deposition of relatively thick lead layers. Note that layers 1600, 1602, and 1604 remain formed adjacent to read sensor structure 1500 and extend upwards around where the monolayer photoresist was previously formed.

Next, a silicon reduction process and a hydrogen reduction process are sequentially performed to selectively deposit a tungsten (W) film in the side regions (step 1216 of FIG. 12). In the silicon reduction process, tungsten hexafluoride ($WF_6$) and argon (Ar) gases of 10 and 190 mTorr (1700 in FIG. 17), respectively, are passed over the wafer at 260° C. in a chemical vapor deposition (CVD) system. After a chemical reaction, namely $2WF_6+3Si \rightarrow 2W+3SiF_4$, a relatively thin and nonporous W film is selectively deposited on silicon reactant layer 1604 only in the side regions, while a by-product $SiF_4$ gas is pumped out. The W film is not deposited at all on the oxide in the read region, indicating 100% selectivity, and the by-product $SiF_4$ gas does not react with the oxide cap layer in the read region. The chemical reaction ceases when the silicon reactant layer is completely consumed.

In the hydrogen reduction process, $WF_6$ and hydrogen ($H_2$) gases of 10 and 190 mTorr (1700 in FIG. 17), respectively, are passed over the wafer at 260° C. in the CVD system. The $WF_6$ gas is preferably adsorbed on the W film surface. After a chemical reaction, namely $WF_6+3H_2 \rightarrow W+6HF$, a relatively thick W film is selectively deposited on the W film only in the side regions, while a by-product HF gas is pumped out. The W film is not deposited at all on the oxide layer in the central region, also indicating 100% selectivity, and the by-product HF gas does not react with the oxide cap layer in the read region. Since any unwanted metallic particles on the oxide layer in the central region may also cause the dissociation of the hydrogen gas, leading to poor selectivity, it is desirable to ensure the surface cleanness of the oxide layer.

High selectivity in the W deposition may be detrimentally affected by impurities such as particles, water, oxygen, carbon dioxide, etc. To ensure high selectivity, an integrated high-vacuum physical-vapor-deposition (PVD)/chemical-vapor-deposition (CVD) system is preferably utilized. After cleaning the silicon surface by sputter-etching in a PVD module of the integrated system, the silicon reduction process is in-situ performed in high purity $WF_6$ and (Ar) gases in a CVD module of the integrated system. Next, the hydrogen reduction process is in-situ performed in high-purity $WF_6$ and $H_2$ gases in the CVD module. The utilization of this integrated system is particularly desirable in the hydrogen reduction process since, without exposure to air, the oxide layer in the central region remains clean while no oxide particles are absorbed onto the W film in the side regions. In addition, this integrated system is preferably equipped with high temperature capability (up to 400° C.) for accelerating the silicon reduction process and the hydrogen reduction process.

Conventional steps may complete the manufacture of the magnetic head (step 1218 of FIG. 12). For example, in FIG. 19 it is shown that a top gap layer 1900 ("G2") of $Al_2O_3$ is deposited over the entire structure. This ends the discussion of the flowchart of FIG. 12. Note that, in the present method, the removal of the monolayer photoresist is relatively unproblematic since it is performed after the deposition of relatively thin hard bias layers and prior to the deposition of relatively thick lead material. A CMP lift-off technique is not required to remove the resist.

Figure 20:
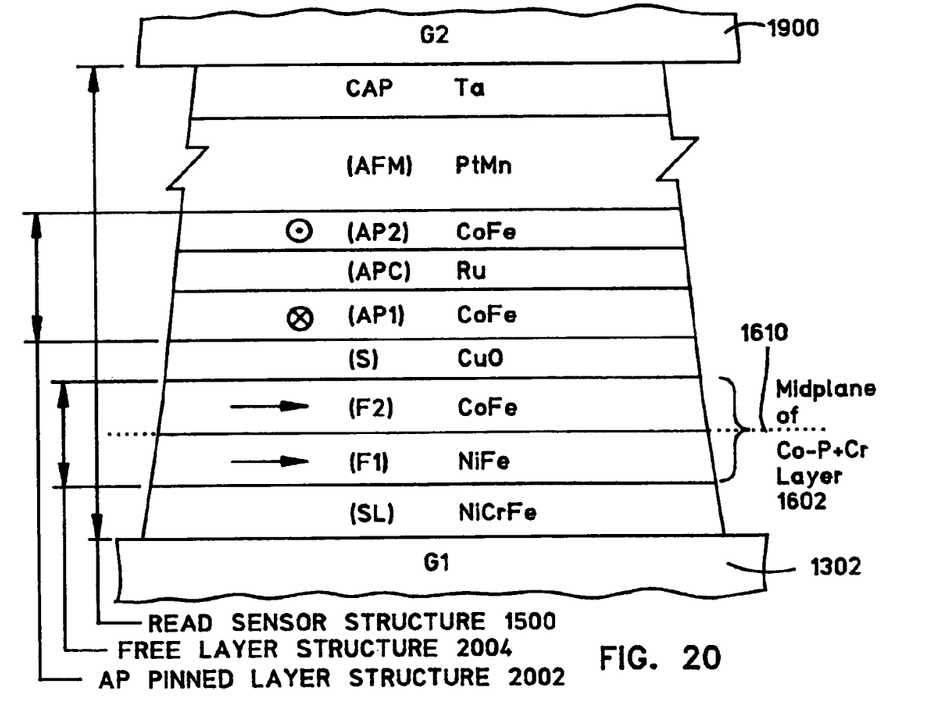
FIG. 20 is a partial ABS illustration of the fabricated read sensor in a close-up view (not to scale).

FIG. 20 is a partial ABS illustration of the fabricated read sensor structure 1500 in a close-up view. This figure better illustrates the composition of the read sensor layers of read sensor structure 1500, as well as the alignment of the hard-magnetic and free layers. Read sensor structure 1500 is formed in a "top-type" configuration where its AP pinned layer structure 2002 is located in an upper portion thereof and its free layer structure 2004 is located in a lower portion thereof. As shown, the preferred layers and thicknesses of read sensor structure 1500 are as follows (from bottom to top): Seed Layer of Ni—Cr—Fe(3)/First Free Layer of Ni—Fe(1)/Second Free Layer of Co—Fe(2)/Spacer Layer of Cu—O(2)/First Pinned Layer of Co—Fe(1.6)/APC Coupling Layer of Ru(0.8)/Second Pinned Layer of Co—Fe(1.8)/AFM layer of Pt—Mn(15)/Cap Layer of Ta(6) (thicknesses in nm). Dotted line 1610 indicates that the midplane of the Co—Pt—Cr hard-magnetic layer is aligned with the free layers of read sensor structure 1500. The Cr film at the contiguous junction is very thin, resulting in minimal separation between the free layers and the Co—Pt—Cr hard Co—Pt—Cr hard-magnetic layer 1602 which substantially increases the stabilization efficiency.

Final Comments. As described herein, a method of making a read head includes the steps of forming a read sensor which is abutted by longitudinal bias layers and selectively depositing lead layers over the longitudinal layers with use of a silicon reduction process and a hydrogen reduction process. In a particular embodiment, the steps of the method include forming a plurality of read sensor layers over a wafer; forming a photoresist over the read sensor layers in a central region; and with the photoresist in place: ion milling so that read sensor layers in side regions are removed to thereby form the read sensor only in the central region; depositing the longitudinal layers in the side regions; depositing a silicon layer over the longitudinal bias layers in the side regions; removing the photoresist; and selectively depositing lead layers over the longitudinal bias layers in the side regions with use of a silicon reduction process and a hydrogen reduction process, by passing a carrier gas which includes lead layer material over the structure so that the carrier gas is chemically reduced. Preferably, the following chemical reaction occurs for the silicon reduction process: $2WF_6+3Si \rightarrow 2W+3SiF_4$, and the following chemical reaction occurs for the hydrogen reduction process: $WF_6+3H_2 \rightarrow W+6HF$.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special meaning different from their plain language meaning, and therefore the specification is not to be used to define terms in an unduly narrow sense.

What is claimed is:

1. A method for use in making a read head, comprising:
   forming a read sensor which is abutted by longitudinal bias layers and has a trackwidth region;
   depositing lead layers selectively over the longitudinal bias layers, without a resist or other mask structure formed over the trackwidth region, and without depositing lead layers over the trackwidth region, using a silicon reduction process and a hydrogen reduction process;
   wherein the read sensor is formed in a top-type configuration with one or more free layers in a lower portion thereof; and
   wherein the longitudinal bias layers have a midplane in alignment with the one or more free layers.

2. The method of claim 1, wherein the acts of depositing the lead layers selectively over the longitudinal bias layers comprises the further acts of performing the silicon reduction process and subsequently performing the hydrogen reduction process.

3. The method of claim 1, further comprising:
   wherein the longitudinal bias layers are deposited in side regions of the read sensor with use of a resist without undercuts over the read sensor in a central region; and
   prior to selectively depositing the lead layers, removing the resist without undercuts.

4. The method of claim 1, wherein the act of selectively depositing the lead layers with use of the silicon reduction process comprises the further acts of:
   depositing a silicon reactant layer over the longitudinal bias layers; and
   passing a carrier gas which includes lead layer material so that the carrier gas is chemically reduced by the silicon.

5. The method of claim 1, wherein the act of selectively depositing the lead layers with use of the silicon reduction process comprises the further acts of:
   depositing a silicon reactant layer over the longitudinal bias layers;
   passing a carrier gas which includes lead layer material so that the carrier gas is chemically reduced by the silicon; and
   wherein the lead layer material comprises tungsten (W).

6. The method of claim 1, wherein the act of selectively depositing the lead layers with use of the silicon reduction process comprises the further acts of:
   depositing a silicon reactant layer over the longitudinal bias layers;
   passing a carrier gas which includes lead layer material so that the carrier gas is chemically reduced by the silicon; and
   wherein the carrier gas comprises fluorine (F).

7. The method of claim 1, wherein the act of selectively depositing the lead layers with use of the silicon reduction process comprises the further acts of:
   depositing a silicon (Si) layer over the longitudinal bias layers;
   passing a carrier gas comprising fluorine (F) which includes lead layer material comprising tungsten (W) so that the carrier gas is chemically reduced by the silicon to selectively deposit the lead layers; and
   wherein the following chemical reaction occurs in the silicon reduction process: $2WF_6+3Si \rightarrow 2W+3SiF_4$.

8. The method of claim 1, wherein the act of selectively depositing the lead layers with use of the hydrogen reduction process comprises the further acts of:
   passing a hydrogen and a carrier gas which includes lead layer material, so that the carrier gas is chemically reduced by the hydrogen gas.

9. The method of claim 1, wherein the act of selectively depositing the lead layers with use of the hydrogen reduction process comprises the further acts of:

passing a hydrogen gas and a carrier gas which include fluorine (F) and tungsten (W), so that the carrier gas is chemically reduced by the hydrogen gas to selectively deposit a W film; and wherein the following chemical reaction occurs in the hydrogen reduction process: $WF_6 + 3H_2 \rightarrow W + 6HF$.

10. The method of claim 1, further comprising:

wherein the read sensor abutted by longitudinal bias layers is formed by:
- forming a plurality of read sensor layers over a wafer;
- forming a photoresist over the read sensor layers in a central region;
- ion milling, with the photoresist in place, so that read sensor layers in side regions are removed to thereby form the read sensor only in the central region;
- with the photoresist in place, depositing the hard longitudinal layers in the side regions;
- removing the photoresist;
- after removing the photoresist, selectively depositing the lead layers over the longitudinal bias layers with use of the silicon reduction process and the hydrogen reduction process.

11. The method of claim 1, further comprising:

wherein the read sensor is formed in a top-type configuration with one or more free layers in a lower portion thereof; and wherein the longitudinal bias layers comprise a Co—Pt—Cr film with a midplane in alignment with a midplane of the one or more free layers.

12. The method of claim 1, wherein the act of selectively depositing the lead layers is performed in an integrated high-vacuum physical-vapor-deposition (PVD)/chemical-vapor-deposition (CVD) system.

13. A method for use in making a read head, comprising:
- forming a read sensor which is abutted by longitudinal bias layers;
- selectively depositing lead layers over the longitudinal bias layers with use of a silicon reduction process and a hydrogen reduction process, the silicon reduction process comprising the further acts of:
  - depositing a silicon reactant layer over the longitudinal bias layers; and
  - passing a carrier gas which includes lead layer material so that the carrier gas is chemically reduced by the silicon.

14. The method of claim 13, wherein the lead layers are selectively deposited over the longitudinal bias layers without a resist or other mask structure formed over the read sensor.

15. The method of claim 13, further comprising:

wherein the read sensor is formed in a top-type configuration with one or more free layers in a lower portion thereof; and wherein the longitudinal bias layers have a midplane in alignment with the one or more free layers.

16. The method of claim 13, wherein the lead layer material comprises tungsten (W).

17. The method of claim 13, wherein the silicon reactant layer comprises a silicon (Si) layer, the carrier gas comprises fluorine (F), the lead layer material comprises tungsten (W), and the following chemical reaction occurs in the silicon reduction process: $2WF_6 + 3Si \rightarrow 2W + 3SiF_4$.

18. The method of claim 13, wherein the act of selectively depositing the lead layers with use of the hydrogen reduction process comprises the further acts of:
- passing a hydrogen gas and a carrier gas which include fluorine (F) and tungsten (W), so that the carrier gas is chemically reduced by the hydrogen gas to selectively deposit a W film; and
- wherein the following chemical reaction occurs in the hydrogen reduction process: $WF_6 + 3H_2 \rightarrow W + 6HF$.

19. A method for use in making a read head, comprising:
- forming a read sensor which is abutted by longitudinal bias layers; and
- selectively depositing lead layers over the longitudinal bias layers with use of a silicon reduction process and a hydrogen reduction process, the hydrogen reduction process comprising the further act of:
  - passing a hydrogen and a carrier gas which includes lead layer material, so that the carrier gas is chemically reduced by the hydrogen gas.

20. The method of claim 19, wherein the lead layers are selectively deposited over the longitudinal bias layers without a resist or other mask structure formed over the read sensor.

21. The method of claim 19, further comprising:

wherein the read sensor is formed in a top-type configuration with one or more free layers in a lower portion thereof; and wherein the longitudinal bias layers have a midplane in alignment with the one or more free layers.

22. The method of claim 19, wherein the lead layer material comprises tungsten (W).

23. The method of claim 19, wherein the carrier gas comprises fluorine (F), the lead layer material comprises tungsten (W), and the following chemical reaction occurs in the hydrogen reduction process: $WF_6 + 3H_2 \rightarrow W + 6HF$.

24. The method of claim 19, further comprising:

wherein the read sensor abutted by longitudinal bias layers is formed by:
- forming a plurality of read sensor layers over a wafer;
- forming a photoresist over the read sensor layers in a central region;
- ion milling, with the photoresist in place, so that read sensor layers in side regions are removed to thereby form the read sensor only in the central region;
- with the photoresist in place, depositing the hard longitudinal layers in the side regions;
- removing the photoresist; and
- after removing the photoresist, selectively depositing the lead layers over the longitudinal bias layers with use of the silicon reduction process and the hydrogen reduction process.

* * * * *